US009696148B2

United States Patent
Crow, Jr.

(10) Patent No.: US 9,696,148 B2
(45) Date of Patent: Jul. 4, 2017

(54) NOSE LANDING GEAR RIGGING ALIGNMENT TOOL HOLDING FIXTURE

(71) Applicant: THE BOEING COMPANY, Chicago, IL (US)

(72) Inventor: John Wesley Crow, Jr., Enumclaw, WA (US)

(73) Assignee: THE BOEING COMPANY, Chicago, IL (US)

( * ) Notice: Subject to any disclaimer, the term of this patent is extended or adjusted under 35 U.S.C. 154(b) by 109 days.

(21) Appl. No.: 14/701,151

(22) Filed: Apr. 30, 2015

(65) Prior Publication Data

US 2016/0318630 A1    Nov. 3, 2016

(51) Int. Cl.
| | | |
|---|---|---|
| *G01B 11/275* | (2006.01) |
| *B64F 5/00* | (2017.01) |
| *B64C 25/50* | (2006.01) |
| *B64F 5/60* | (2017.01) |

(52) U.S. Cl.
CPC ............ *G01B 11/275* (2013.01); *B64C 25/50* (2013.01); *B64F 5/60* (2017.01)

(58) Field of Classification Search
CPC ........ B64F 5/0009; B64F 5/0045; B64F 5/60; G01B 11/27; G01B 11/275; G01C 15/006
USPC ............................ 33/228, 286, 263, 264, 227
See application file for complete search history.

(56) References Cited

U.S. PATENT DOCUMENTS

| | | | | | |
|---|---|---|---|---|---|
| 4,422,757 | A * | 12/1983 | Munski | .................. | G01B 11/26 33/286 |
| 4,432,145 | A * | 2/1984 | Caroff | .................... | G01B 5/255 33/203.18 |
| 4,889,425 | A * | 12/1989 | Edwards | ................ | G01B 11/26 33/263 |
| 5,675,901 | A * | 10/1997 | Young | ....................... | B43L 7/10 33/451 |
| 5,747,769 | A * | 5/1998 | Rockstroh | ............ | B23K 26/364 219/121.69 |
| 6,098,297 | A * | 8/2000 | Belfiore | ................. | G01B 11/27 33/286 |
| 6,347,457 | B1 * | 2/2002 | Espinoza | ............. | G01B 5/0025 33/286 |
| 6,438,855 | B1 * | 8/2002 | Bremer | ................ | G01B 11/275 33/203 |
| 6,622,390 | B2 * | 9/2003 | Brusius | .................. | G01C 15/00 33/286 |
| 6,708,782 | B1 * | 3/2004 | Turney | .................... | E21B 7/067 175/40 |

(Continued)

*Primary Examiner* — Christopher Fulton
(74) *Attorney, Agent, or Firm* — Patterson + Sheridan, LLP

(57) ABSTRACT

Method and apparatus for providing an alignment indication for a nose landing gear of an aircraft. The apparatus includes surfaces that abut certain features of the nose landing gear. When the surfaces of the fixture and the features of the nose landing gear abut, the fixture is aligned with the nose landing gear and oriented such that a coherent light source emits a coherent light beam that impinges on an alignment scale. The coherent light beam can be sufficiently small that a mechanic or other user can discern the alignment of the nose landing gear to within one or two degrees. After the nose landing gear has been moved to a centered position, control rigging that communicates steering inputs from pilots to a hydraulic actuation system can be adjusted so that the steering inputs are also centered.

15 Claims, 12 Drawing Sheets

(56) References Cited

U.S. PATENT DOCUMENTS

| | | | | |
|---|---|---|---|---|
| 7,165,332 B2* | 1/2007 | McGrail | ............... | A63D 15/005 |
| | | | | 33/227 |
| 8,016,277 B2* | 9/2011 | Choi | ...................... | B82Y 10/00 |
| | | | | 269/58 |
| 8,171,770 B2* | 5/2012 | Nugent | ................. | G01P 13/025 |
| | | | | 33/286 |
| 8,209,874 B1* | 7/2012 | Tribble | ................ | G01C 15/004 |
| | | | | 33/227 |
| 8,250,770 B2* | 8/2012 | Diefenderfer | ......... | F16H 57/022 |
| | | | | 33/286 |
| 9,302,785 B2* | 4/2016 | Buckus | ................. | B64F 5/0009 |
| 2002/0069542 A1* | 6/2002 | Musacchia, Jr. | ...... | B23D 59/002 |
| | | | | 33/286 |
| 2015/0356236 A1* | 12/2015 | Bense | ................. | G06F 17/5095 |
| | | | | 703/8 |

* cited by examiner

NOSE LANDING GEAR RIGGING ALIGNMENT TOOL HOLDING FIXTURE

BACKGROUND

The present aspects relate to a steering alignment fixture, and more specifically, to a steering alignment fixture for the landing gear of an aircraft.

Many modern aircraft use a tricycle landing gear arrangement, meaning that a steerable nose landing gear is arranged proximate to the nose of the aircraft and main landing gear (which are designed to contact the ground first when the aircraft lands) are located aft relative to the nose landing gear. The nose landing gear is steerable so that the pilots can guide the aircraft along runways, taxiways, and parking aprons. It is important that the steerable nose landing gear is centered when the pilots steering inputs (rudder pedals) are centered. Otherwise, when the steerable nose landing gear touches the ground upon landing, the aircraft may unexpectedly veer to the left or the right. In many instances, aircraft manufacturers and/or aircraft operators (e.g. airlines) require a particular alignment tolerance to avoid such unexpected veering upon landing. For example, certain manufacturers and/or operators may require the steerable nose landing gear to be aligned within 3° of center. If the alignment is more than 3° from center, then the aircraft could be removed from service so that the steering mechanism can be realigned.

SUMMARY

According to one aspect, an apparatus for providing an alignment indication between two components, wherein a first component is movable relative to a second component, includes a first surface that includes a first curved surface that matches a first curved feature of the first component. The apparatus also includes a second surface that matches a second feature of the first component, wherein the first surface and the second surface are arranged at an angle to one another. The apparatus also includes a light source arranged relative to the first surface and the second surface. The light source is operable to emit a coherent light beam, wherein the light source is arranged relative to the first surface and the second surface such that the coherent light beam impinges on an alignment scale on the second component when the first surface is arranged on the first feature and the second surface is arranged on the second feature.

According to one aspect, a steering alignment fixture for a steerable nose landing gear of an aircraft, wherein the steerable nose landing gear includes a non-steerable portion and a steerable portion operable to rotate about the non-steerable portion, wherein the steerable portion includes a torsion link configured to transmit steering torque from an actuator to a wheel, and wherein the non-steerable portion includes an alignment scale, includes a body that includes a first surface and a second surface. The first surface includes a first curved surface that matches a curved feature of a torsion member of the landing gear. The first curved surface is configured to rest on the curved feature of the torsion link of the landing gear. The second surface is configured to abut a first side-facing feature of the torsion link. The steering alignment fixture also includes a light source arranged relative to the body that is operable to emit a coherent light beam. The light source is arranged such that the coherent light beam impinges on the alignment scale when the first surface of the body rests on the torsion link and the second surface abuts the first side-facing feature of the torsion link.

According to one aspect, a method for aligning a nose landing gear of an aircraft includes arranging an alignment fixture tool on a torsion link of the nose landing gear such that a first surface of the alignment fixture rests on a first feature of the torsion link and a second surface of the alignment fixture abuts a first side-facing feature of the torsion link. The method also includes activating a coherent light source arranged relative to the alignment fixture such that a coherent light beam emitted by the coherent light source impinges on an alignment scale on the nose landing gear. The method also includes adjusting the nose landing gear such that the coherent light beam impinges on a center indication on the alignment scale. The method also includes adjusting rigging between hydraulic actuators controlling rotation of the nose landing gear and at least one nose wheel steering input such that the at least one nose wheel steering input is substantially centered upon the coherent light beam impinging on the center indication.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1A:
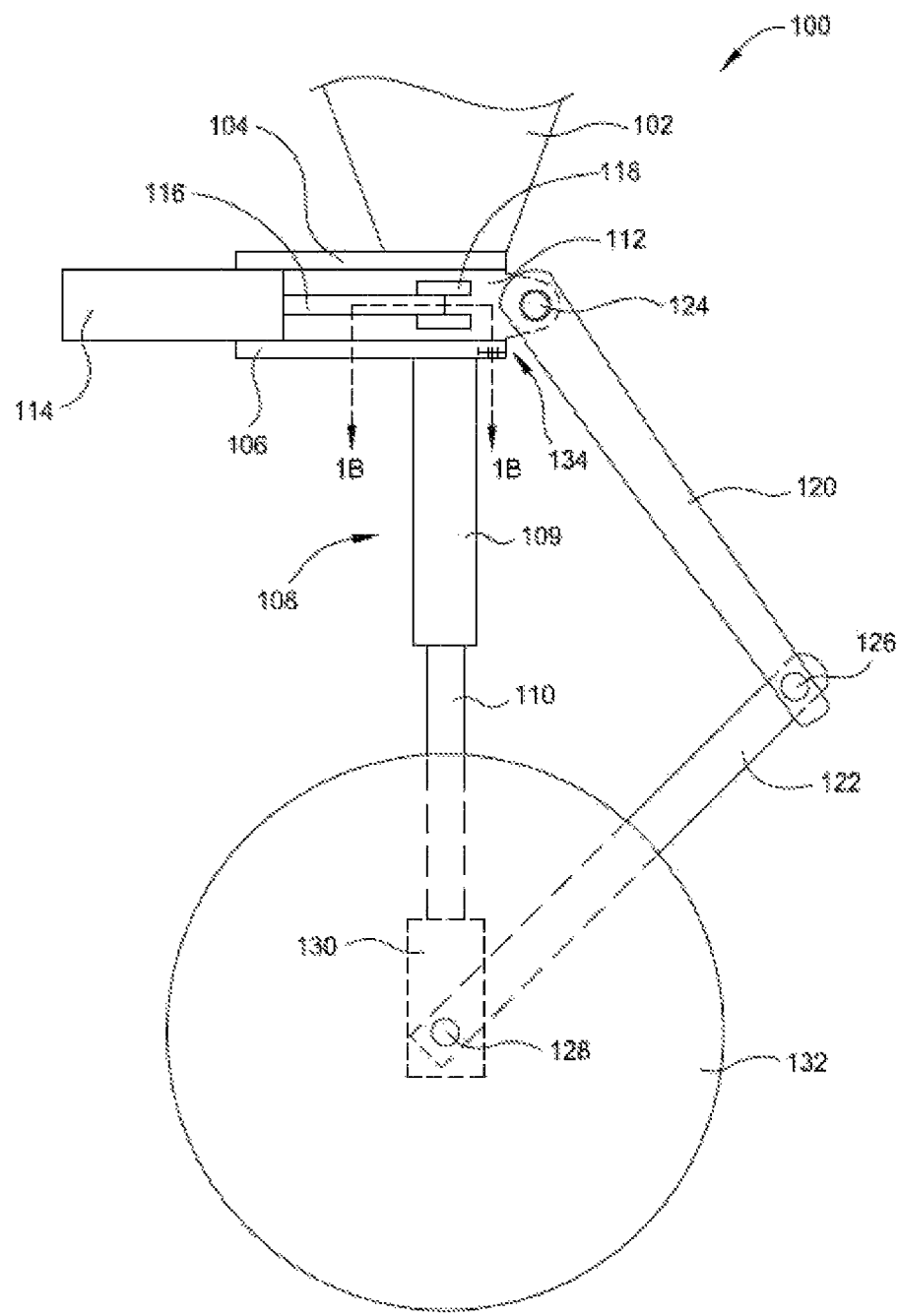
FIG. 1A is a side view of an exemplary steerable nose landing gear of an aircraft.
Figure 1B:
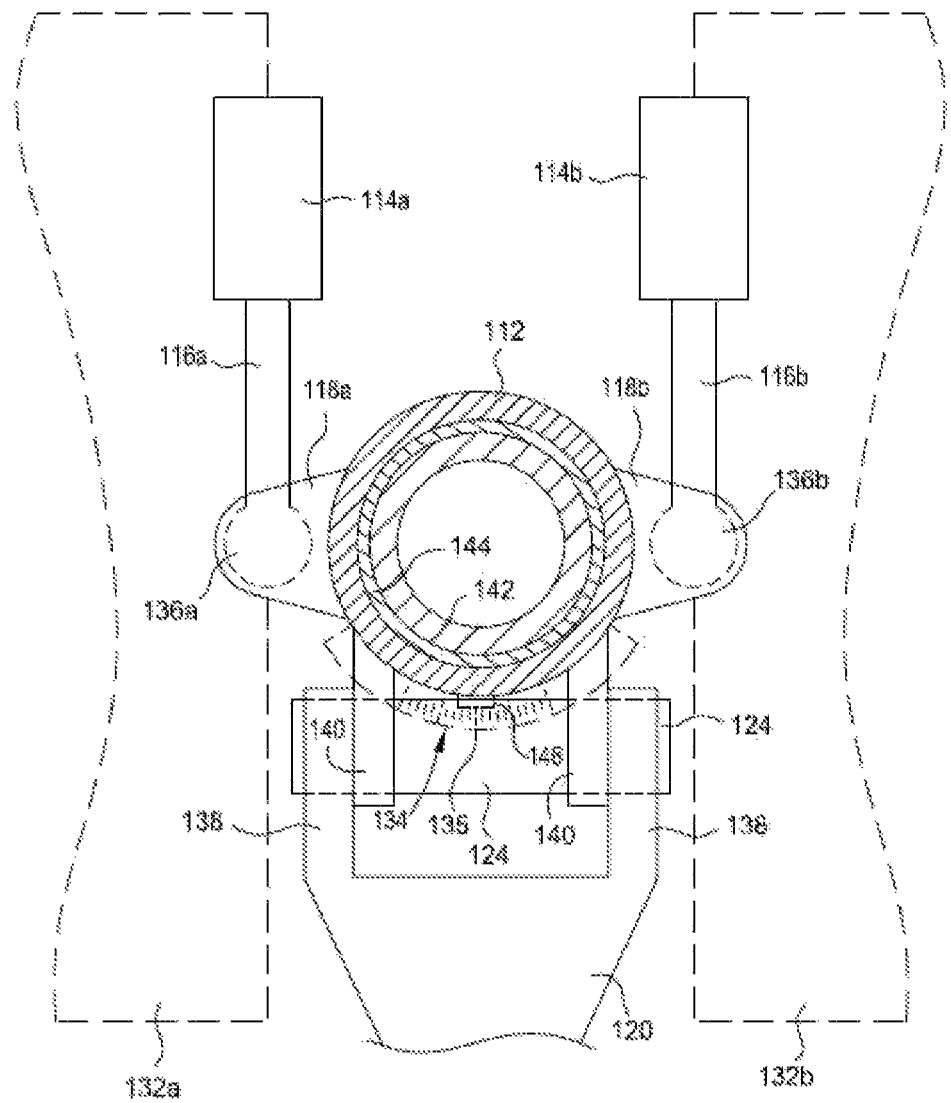
FIG. 1B is a partial cross-sectional top view of the exemplary steerable nose landing gear shown in FIG. 1A.

FIGS. 1A and 1B illustrate a partial side view and a partial cross-sectional top view of an exemplary steerable nose landing gear 100 for an aircraft. The steerable nose landing gear 100 includes a top portion 102 that connects to the fuselage of the aircraft. The top portion 102 may also be connected to a hinge mechanism (not shown) that allows the steerable nose landing gear 100 to retract. The top portion 102 may be attached to one or more steering brackets. In the illustrative aspect, the top portion 102 is rigidly affixed to a first steering bracket 104. A second steering bracket 106 is disposed in parallel relative to the first steering bracket 104, and the two brackets may be connected to each other. The top portion 102 and the steering brackets 104, 106 are non-rotating, meaning that the components do not rotate in response to steering inputs. In this way, the non-rotating portions of the steerable nose landing gear 100 are always aligned with the remainder of the airframe of the aircraft.

In contrast, a wheel(s) and tire(s) assembly 132 of the steerable nose landing gear 100 is operable to rotate relative to the non-rotating portions and the airframe generally, thereby allowing the aircraft to be steered. In the illustrated aspect, the wheel(s) and tire(s) assembly 132 is attached to one or more of the non-rotating components by a shock absorber 108. In a particular aspect, the shock absorber 108 is attached to the steering bracket 106. The shock absorber 108 may be any variety of pneumatic, hydraulic and/or mechanical shock absorbers and generally includes a cylinder 109 and axially slidable piston rod 110 disposed therein. In operation, the shock absorber 108 cushions any impact forces from the wheel(s) and tire(s) assembly 132 that occur upon contacting the ground during landing or while driving over uneven terrain. The wheel(s) and tire(s) assembly 132 is rotatably mounted to a distal end of the piston rod 110 in a manner that allows the wheel(s) and tire(s) assembly 132 to rotate for steering relative to the non-rotating shock absorber 108 (as well as the steering brackets 104 and 106 and the top portion 102). In one aspect, this arrangement is achieved by attaching the wheel(s) and tire(s) assembly 132 to the piston rod 110 via bearing 130.

The steerable nose landing gear 100 includes rotatable portions that urge the wheel(s) and tire(s) to rotate to the left or the right for steering. The steerable nose landing gear 100 includes a steering head 112 arranged between the steering brackets 104 and 106. As shown in FIG. 1B, the steering head 112 can be arranged around a non-rotating landing gear structure 142. The non-rotating landing gear structure 142 could be attached to the top portion 102 of the steerable nose landing gear 100 and to the cylinder 109 of the shock absorber 108. For example, the steering brackets 104 and 106 could include holes (not shown) therethrough, and the non-rotating landing gear structure 142 could be connected to the top portion 102 of the steerable nose landing gear 100 through the holes. The non-rotating landing gear structure 142 could be hollow (as shown in FIG. 1B) or could be solid. A bearing 144 (or bushing or the like) can be arranged between the non-rotating landing gear structure 142 and the steering head 112 to enable the steering head 112 to rotate about the non-rotating landing gear structure 142. The steering head 112 can be urged to rotate about the non-rotating landing gear structure 142 by actuators 114a and 114b (collectively actuators 114). The actuators 114 could be hydraulic actuators, electric actuators, pneumatic actuators, or any other type of actuator. The actuator 114a can be coupled to a first steering flange 118a of the steering head 112 by a first connecting rod 116a and a first connecting rod flange 136a. The actuator 114b can be coupled to a second steering flange 118b of the steering head 112 by second connecting rod 116b and a second connecting rod flange 136b. The actuators 114 can act in concert to rotate the steering head 112 about the non-rotating landing gear structure 142. For example, actuator 114a could retract the connecting rod 116a (i.e., draw the connecting rod 116a toward the actuator 114a) while the actuator 114b extends the connecting rod 116b (i.e., push the connecting rod 116b away from the actuator 114b) to rotate the steering head 112 in a clockwise direction, as viewed in FIG. 1B. By contrast, actuator 114a could extend the connecting rod 116a while the actuator 114b retracts the connecting rod 116b to rotate the steering head 112 in a counterclockwise direction as viewed in FIG. 1B.

In one aspect, rotation of the steering head 112 is transmitted to the wheel(s) and tire(s) assembly 132 by a torsion link assembly. In a particular aspect, the torsion link assembly includes first torsion link 120 and a second torsion link 122. The first torsion link 120 and the second torsion link 122 are attached together and can rotate relative to one another about a pin 126. The first torsion link 120 is attached to the steering head 112 by a pin 124. The second torsion link 122 is attached to the bearing 130 and/or the wheel(s) and tire(s) assembly 132 by a pin 128. The pins 124, 126, and 128 allow the first torsion link 120 and the second torsion link 122 to move and adjust their geometry relative to each other to compensate for movement of the wheel(s) and tire(s) assembly 132 as the piston 110 of the shock absorber moves relative to the cylinder 108 of the shock absorber. The first torsion link 120 includes two torsion link flanges 138. The steering head 112 includes a third set of steering flanges 140 extending outwardly. The third set of steering flanges 140 includes two flanges, each flange mating with a respective one of the torsion link flanges 148. Holes formed in each of the flanges 140, 148 are registered with one another in order to receive the pin 124. In various instances, the pin 124 is made of a ferrous material (i.e., a material that will attract a magnet). When the steering head 112 is turned in a clockwise or counterclockwise direction (as shown in FIG. 1B) the third steering flange 140 and the pin 124 will push the first torsion link 120 in a clockwise or counterclockwise direction, respectively, as viewed in FIG. 1B. The first torsion link 120 will likewise push the second torsion link 122 in the same direction, and the second torsion link 122 will turn the bearing 130 and the wheel(s) and tire(s) assembly 132 to steer the aircraft.

The steerable nose landing gear 100 includes an alignment scale 134 that can be used by a mechanic or the like to check the alignment of the steerable nose landing gear 100. As shown in FIG. 1A, the alignment scale 134 could be located on the steering bracket 106. The steering head 112 may include a raised or depressed indicator 146 that indicates the direction in which the wheel(s) and tire(s) assembly 132 are pointed. For example, in aspects in which the steering head 112 is formed from a metal casting, the raised or depressed indicator 146 could be a cast feature. When the indicator 146 is aligned with a center mark 135 on the alignment scale 134, the steerable nose landing gear 100 should be aligned, meaning that the wheel(s) and tire(s) assembly 132 are pointed straight ahead (in the same direction as the nose of the aircraft). However, the indicator 146 may be wide enough so that it covers several degrees of rotation on the alignment scale 134. In FIG. 1B, the alignment scale 134 as shown in FIG. 1A would not be visible. Thus, the alignment scale 134 is shown in FIG. 1B in a visible orientation (as indicated by the dashed outline) so that the arrangement of the alignment scale 134 relative to other parts shown and discussed in FIG. 1B is clear. In various aspects, the alignment scale 134 could be arranged on a rotating structure (e.g., on the steering head 112) and the indicator 146 arranged on a non-rotating structure (e.g., on the steering bracket 106).

Figure 1C:
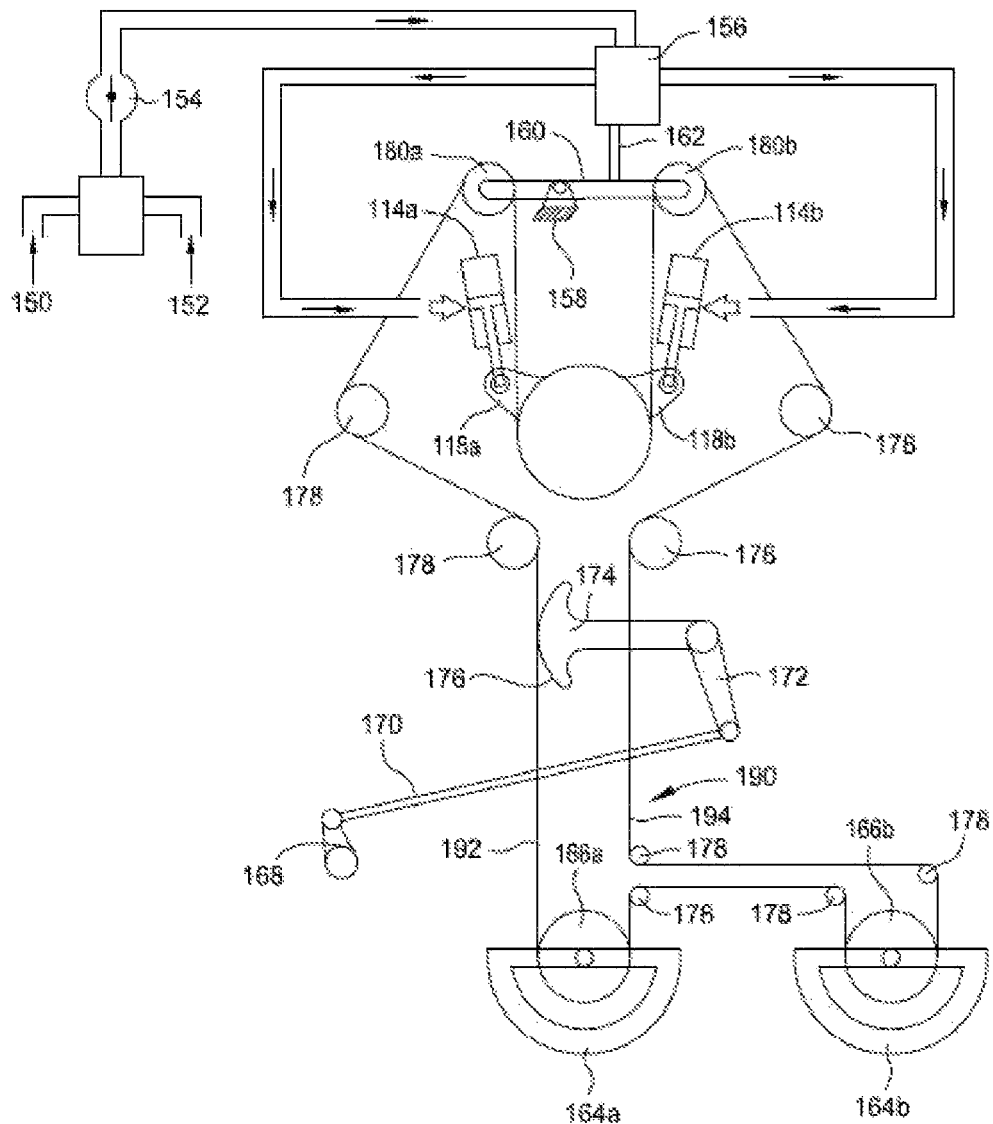
FIG. 1C is a schematic diagram of control rigging between steering inputs for a steerable nose landing gear and hydraulic actuators that rotate the nose landing gear for steering.

FIG. 1C is a schematic diagram of a hydraulic system for steering the steerable nose landing gear 100, including actuators 114 (in this case, hydraulic actuators), and rigging between steering inputs and the hydraulic system. The hydraulic system includes a main hydraulic supply line 150 and an alternate hydraulic supply line 152. For example, for a twin engine aircraft, the main hydraulic supply line 150 may be fed from a hydraulic pump associated with one of the two engines for the aircraft. In the event that the hydraulic pump associated with the first one of the two engines fails, hydraulic pressure can be provided by the hydraulic pump associated with the second of the two engines via the alternate hydraulic supply line 152. The hydraulic system can include a shut off valve 154. The hydraulic system can also include a steering metering valve 156 that sends hydraulic fluid (and hydraulic pressure) to the actuators 114*a* and 114*b* to actuate the actuators 114*a* and 114*b*. Operation of the steering metering valve 156 is controlled by a pivot arm 160 that pivots about a pivot 158. The pivot arm 160 is connected to a link 162 that can move in and out relative to the steering metering valve 156, causing the steering metering valve 156 to distribute hydraulic fluid (and pressure) to actuator 114*a* or actuator 114 B. The pivot arm 160 is moved by a cable 190, which is coupled to (i.e., in mechanical communication with) steering inputs in the aircraft flight deck.

Pilots in the flight deck of the aircraft often have one or two different steering inputs. First, the rudder pedals in the flight deck are often linked to the steerable nose landing gear 100. For example, if the pilot pushes on the left rudder pedal, then the steerable nose landing gear 100 will turn to the left. Likewise, if the pilot pushes on the right rudder pedal, then the steerable nose landing gear 100 will turn to the right. The rudder pedals can be connected to the cable 190 by a series of links 168, 170, and an input bell 174. The input bell 174 can include a curved surface 176 that's in communication with the cable 190 such that movement of the input bell 174 correspondingly urges the cable 190 in a first direction or in a second opposite direction, depending on which rudder pedal is pushed. Some aircraft are also equipped with a tiller 164 (i.e., a small steering wheel) that is used when the aircraft is on the ground and below a certain speed (e.g., 80 knots). In many instances, an aircraft will include a single tiller 164*a* on the left hand side (i.e., the captain's side) of the flight deck. In some instances, an aircraft will include a second tiller 164*b* on the right hand side (i.e., the first officer's side) of the flight deck. The tillers 164*a* and 164*b* can be connected to input pulleys 166*a* and 166*b*, respectively. The input pulleys 166*a* and 166*b* are in communication with the cable 190 such that rotation of the input pulleys 166*a* and 166*b* correspondingly urges the cable 190 in a first direction or in a second opposite direction depending on the direction in which the tillers 164*a* and 164*b* are turned. The cable 190 is routed via idler pulleys 178 to pulleys 180*a* and 180*b* at ends of the pivot arm 160. When the cable 190 is urged in a first direction (e.g., when side 192 of the cable 190 is urged toward the tiller 164*a*), then the pivot arm 160 pivots about the pivot 158 in a first direction. When the cable 190 is urged in a second opposite direction (e.g., when side 194 of the cable 190 is urged toward the tiller 164*b*), then the pivot arm 160 pivots about the pivot 158 and a second opposite direction. Occasionally, the rigging between the steering inputs (e.g., the rudder pedals and the tillers) and the hydraulic system can become misaligned. For example, over time the cable 190 may stretch or slip. As a result, the steering inputs may not be centered when the steerable nose landing gear is centered. Put differently, if the steering inputs are centered when the rigging is out of alignment, the steerable nose landing gear could be pointed to one side.

Referring again to FIG. 1B, to correct the rigging, aircraft mechanics would align the steerable nose landing gear using the alignment scale 134 and the center indicator 146. Mechanics would then make any adjustments necessary to the rigging to center the steering inputs. However, as discussed above, the center indicator 146 is usually wide enough to cover several degrees of rotation. Thus, it is possible for the steerable nose landing gear 100 to still be out of alignment when the center indicator 146 indicates that the rotatable portions of the steerable nose landing gear 100 are centered. In such instances, the only way to determine whether the nose landing gear and the rigging are properly aligned is to test the aircraft by taxiing the aircraft along the ground and checking whether the aircraft tracks in a straight line or veers in one direction. The mechanics may have to perform several iterative rigging adjustments, with ground tests between iterations, to adequately center and align the rigging.

In aspects described herein, an alignment fixture is placed on the first torsion link 120 of the steerable nose landing gear 100. The alignment fixture uses a coherent light beam (e.g., a polarized laser beam) that impinges on the alignment scale 134 and provides a more accurate indication of the direction in which the steerable nose landing gear 100 is pointed. By more accurately centering the steerable nose landing gear 100, the number of adjustments to the rigging may be reduced to one iteration, thereby reducing maintenance time.

Figure 2A:
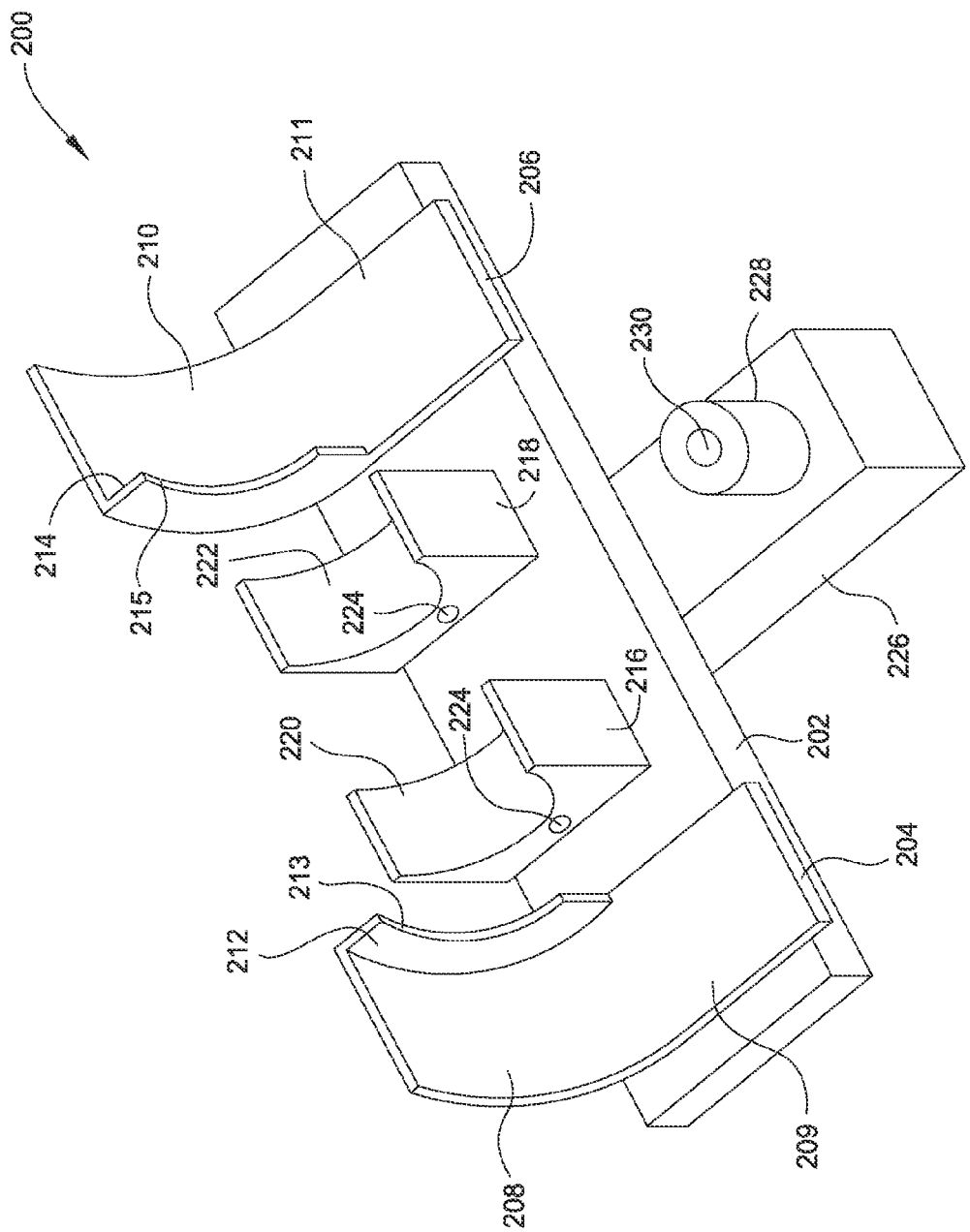
FIG. 2A is a bottom perspective view of an alignment fixture according to at least one aspect that can be used to align a steerable nose landing gear of an aircraft, such as the nose landing gear shown in FIGS. 1A and 1B.
Figure 2B:
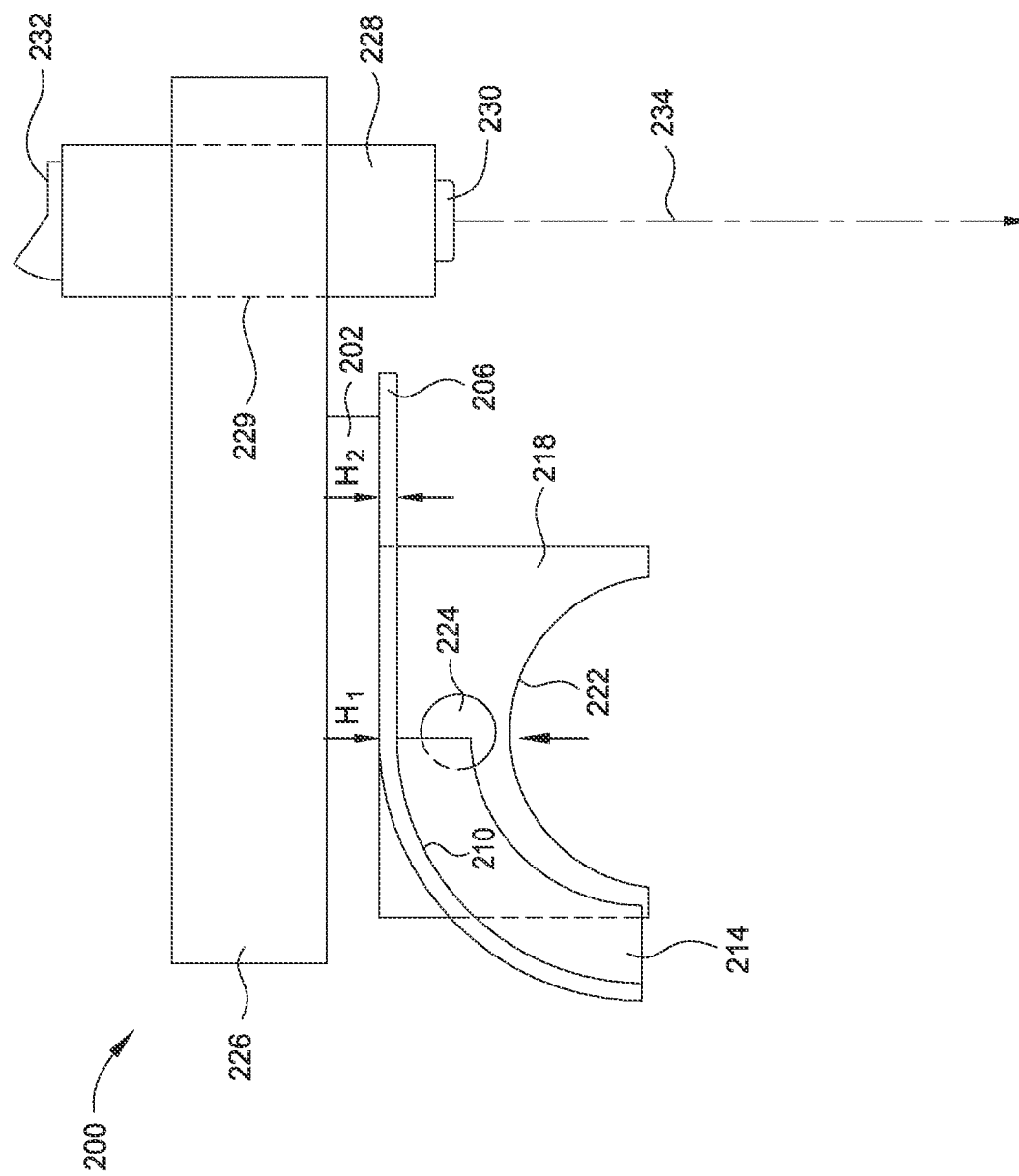
FIG. 2B is a side view of the alignment fixture of FIG. 2A.
Figure 3A:
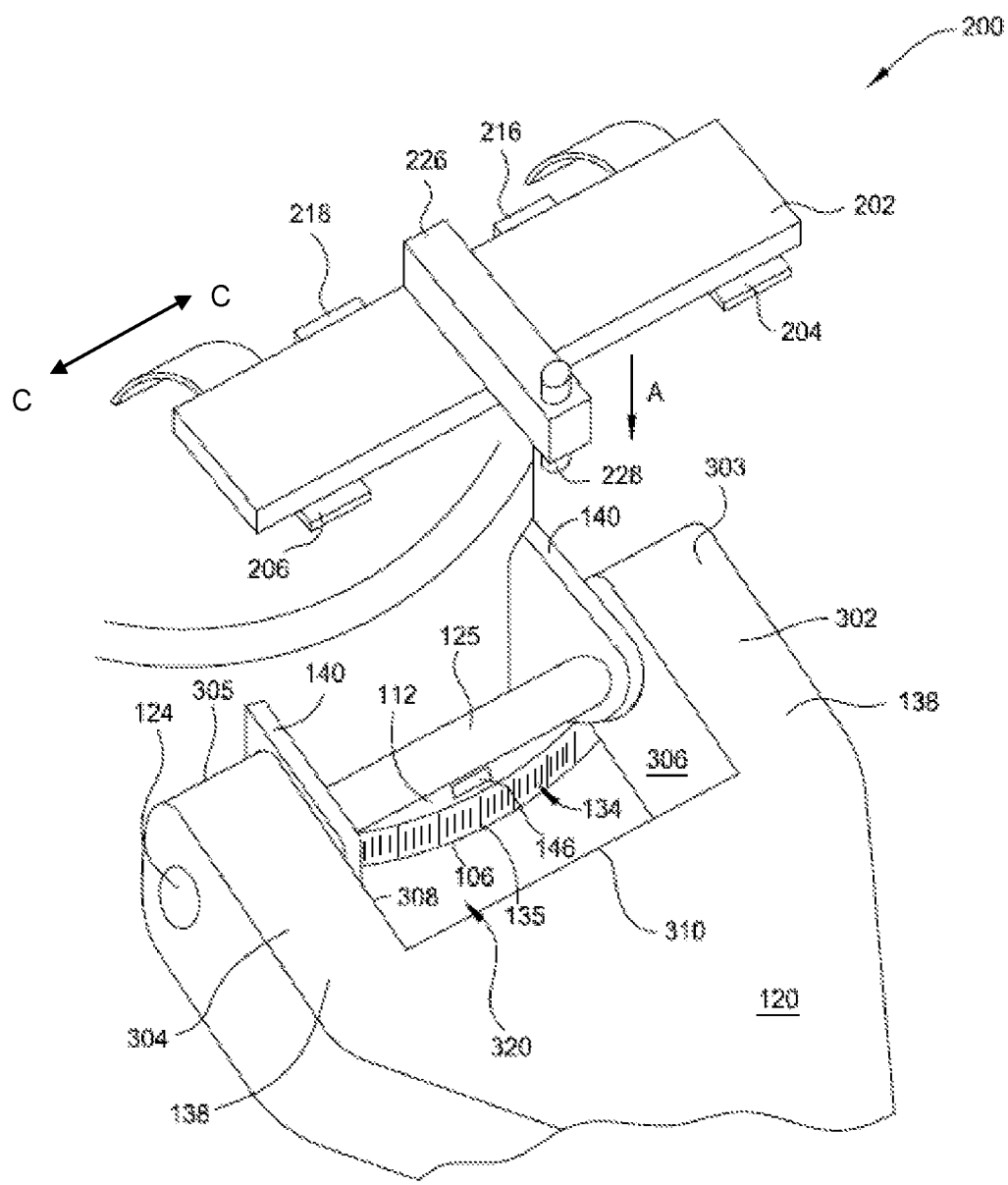
FIG. 3A is a partial perspective view of the nose landing gear of FIGS. 1A and 1B, wherein the alignment fixture shown in FIGS. 2A and 2B is being moved into position.
Figure 3B:
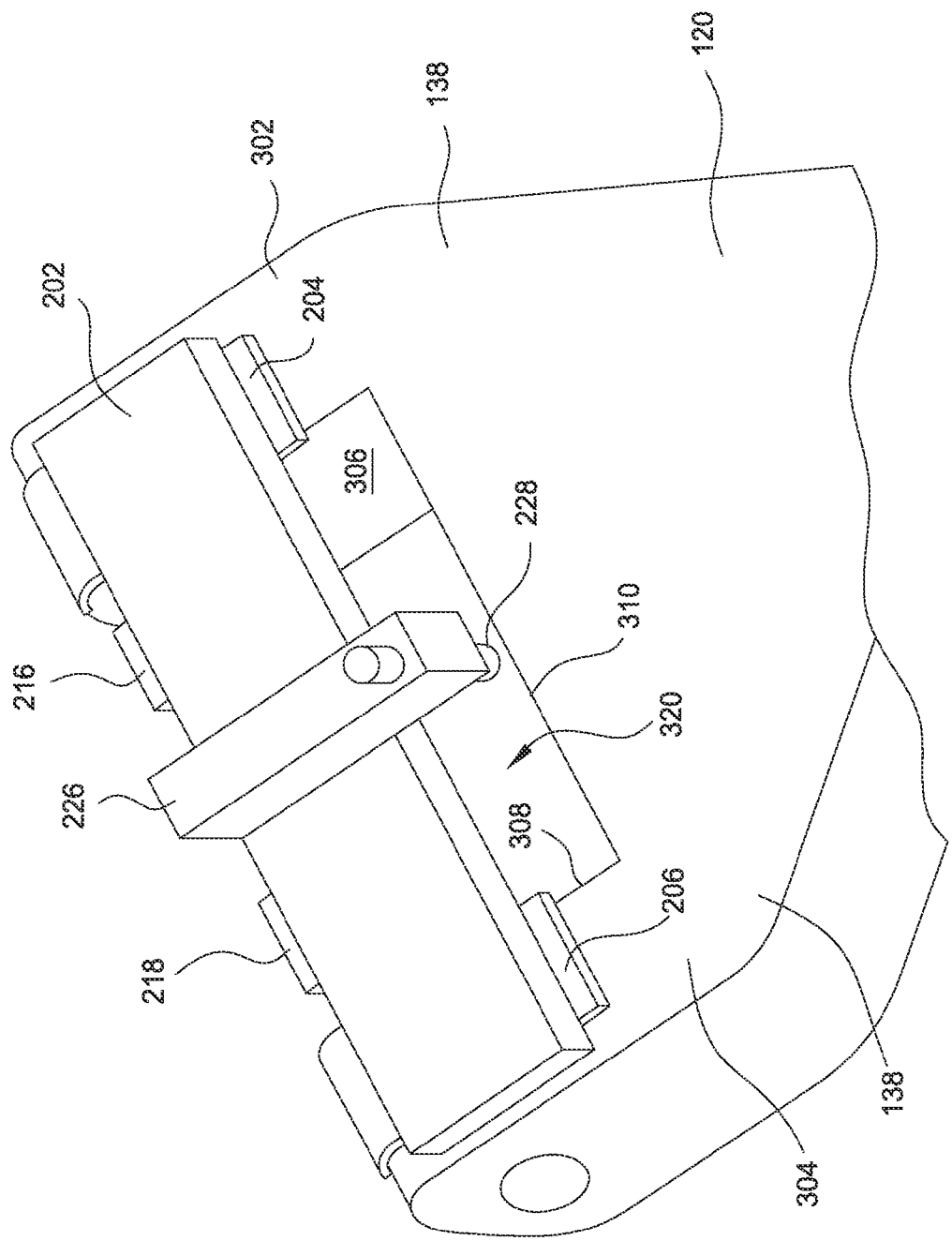
FIG. 3B is a partial perspective view of the nose landing gear of FIGS. 1A and 1B, wherein the alignment fixture is positioned on a torsion link of the nose landing gear.

FIGS. 2A and 2B illustrate an exemplary fixture 200 that can be placed on the first torsion link 120 of the landing gear to provide a more accurate indication of the direction in which the steerable nose landing gear 100 is pointed. The fixture 200 includes a body 202 and a first torsion link mating plate 204 and a second torsion link mating plate 206 mounted to the body 202. The first torsion link mating plate 204 includes a flat surface 209 that transitions into a circular curved surface 208. Similarly, the second torsion link mating plate 206 includes a flat surface 211 that transitions into a circular curved surface 210. FIG. 3A illustrates the fixture 200 positioned above the first torsion link 120. When the fixture 200 is placed on the first torsion link 120 (as shown in FIG. 3B), the flat surfaces 209 and 211 rest on flat surfaces 302 and 304, respectively, of the first torsion link 120. Also, the circular curved surfaces 208 and 210 rest on and abut curved features 303 and 305, respectively, of the first torsion link 120. The first torsion link mating plate 204 also includes a locating plate 213 that extends away from the circular curved surface 208. The locating plate 213 includes an outward-facing surface 212. The second torsion link mating plate 206 also includes a locating plate 215 extends away from the circular curved surface 210. The locating plate 215 includes an outward-facing surface 214. Referring again to FIGS. 3A and 3B, when the fixture 200 is placed on the first torsion link 120, the outward-facing surfaces 212 and 214 abut inward-facing features 306 and 308, respectively, of the first torsion link 120. The inward-facing features 306 and 308 of the first torsion link 120 provide a reference location such that the fixture 200 is centered on the first torsion link 120 when the outward facing surfaces 212 and 214 of the first torsion link mating plate 204 and the second torsion link mating plate 206 respectively abut the inward-facing features 306 and 308 of the first torsion link 120. Furthermore, the flat surfaces 209 and 211 of the first torsion link mating plate 204 and the second torsion link mating plate 206 resting on the flat surface 302 and 304 of the first torsion link 120 positions the fixture 200 at a particular angle relative to the steering bracket 106 (shown in FIG. 1A).

In various aspects, the various surfaces of the fixture 200 mate with, abut, and/or rest on features of the nose landing gear that are not coplanar. For example, the fixture 200 may abut a first feature and a second feature of the nose landing gear that are arranged at a 90° angle with respect to one another. Additionally, one of the features could include a curved surface such that the fixture 200 can only mate with the feature in one position. By forming the fixture 200 to conform to the features of the nose landing gear, the fixture 200 can be "keyed" to the nose landing gear. As a result, the fixture 200 may only securely rest on the nose landing gear in a single position and orientation that aligns the fixture 200 relative to the nose landing gear. In various aspects, the nose landing gear could include a third feature (e.g., a third feature that is arranged at a 90° angle relative to the first feature and the second feature. For example, the first feature, second feature, and third feature could meet at a corner having 90° angles between the sides. A fixture arranged to mate with these three features could include first, second, and third surfaces also form a corner with 90° angles between the surfaces. The fixture would only fit in a particular position and orientation over the nose landing gear such that the first, second, and third surfaces that abut the first, second, and third features, respectively.

In various aspects, only one of the outward-facing surfaces 212 and 214 of the locating plates 213 and 215 needs to abut an inward-facing feature 306 or 308, respectively, to properly locate the fixture 200 relative to the first torsion link 120. In such aspects, the first torsion link mating plate 204 or the second torsion link mating plate 206 could be movable to facilitate installation of the fixture 200 on the first torsion link 120. For example, the second torsion link mating plate 206 could be slidable toward or away from the first torsion link mating plate 204 in the direction of arrows C. The fixture 200 could be placed on the first torsion link 120 with the second torsion link mating plate 206 in a position closest to the first torsion link mating plate 204. The abutting outward-facing surface 212 of the locating plate 213 of the first torsion link mating plate 204 and the inward-facing feature 306 of the first torsion link 120 properly locates and aligns the fixture 200 with the first torsion link 120. Thereafter, the second torsion link mating plate 206 could slide away from the first torsion link mating plate 204 such that the outward-facing surface 214 of the locating plate 215 on the second torsion link mating plate 206 abuts the inward-facing feature 308 of the first torsion link 120.

In various aspects, the fixture 200 can include a first ferrous pin mating plate 216 and a second ferrous pin mating plate 218 which are attached to the body 202. As discussed above, the pin 124 that couples the first torsion steering link 120 to the steering head 112 can be made of a ferrous metal. Additionally, the pin 124 can have a cylindrical surface 125. The first ferrous pin mating plate 216 and the second ferrous pin mating plate 218 can include circular curved surfaces 220 and 222 that abut the cylindrical surface 125 (shown in FIG. 3A) of the ferrous pin 124. The first ferrous pin mating plate 216 and the second ferrous pin mating plate 218 can include magnets 224 embedded therein. When the fixture 200 is placed on the first torsion link 120, an attractive magnetic force between the magnets 224 and the ferrous pin 124 can securely hold the fixture 200 in place on the first torsion link 120. The fixture 200 can also include a bracket 226 attached to the body. In various other aspects, the fixture 200 could be secured to the first torsion link 120 by Velcro straps, zip ties, bungee cords, or the like.

Referring to FIGS. 2B and 3A, the curved surface 125 of the pin 124 may not be at the same level as the flat surfaces 302 and 304 and the curved features 303 and 305 of the first torsion link 120. As a result, the flat surfaces 211 and 209 and the circular curved surfaces 208 and 210 of the fixture 200 may be arranged at different heights relative to the body 202. For example, FIG. 2B illustrates the flat surfaces 211 and 209 of the first torsion link mating plate 204 and the second torsion link mating plate 206 arranged at a height of $H_2$ relative to the body 202. FIG. 2B illustrates the point of the circular curved surfaces 220 and 222 of the first ferrous pin mating plate 216 and the second first pin mating plate 218, respectively, closest to the body 202 arranged at a height $H_1$ relative to the body 202. In this exemplary aspect, the height $H_1$ is greater than the height $H_2$.

The fixture 200 can also include a bracket 226 attached to the body 202. The bracket 226 can house a coherent light source 228 (e.g., a laser) relative to the body 202. The coherent light source 228 is operable to emit a coherent light beam. For example, the brackets 226 can include an aperture 229 there through, and the coherent light source 228 can be arranged in the aperture 229. The coherent light source 228 can optionally include a polarizing filter 230 arranged over an optical output. The polarizing filter 230 can reduce the size of the beam of emitted light 234. The coherent light source 228 can include an on/off switch 232 to turn the path of emitted light 234 on and off.

Referring again to FIG. 3B, when the fixture 200 is arranged on the first torsion link 120, the coherent light source 228 can be arranged in an aperture 320 through the first torsion link 120. In the exemplary scenario, the aperture 320 is defined by and bound by the pin 124, the inward-facing features 306 and 308 of the first torsion link 120, and a wall 310 of the first torsion link 120. FIG. 4B illustrates a side view of the fixture 200 arranged on the first torsion link 120. As shown (and as referenced above), the mating flat surfaces 211 and 304 of the fixture 200 and the first torsion link 120 arrange the fixture 200 at an angle such that the emitted light beam 234 impinges on the alignment scale 134 that is arranged on the steering bracket 106 (or on another non-rotating portion of the steerable nose landing gear). By observing the impingement point 236 of the path of emitted light 234 on the alignment scale 134, the steerable portions of the steerable nose landing gear 100 can be accurately centered. In various instances, such as when a polarizing filter 230 is arranged in the path of emitted light 234, the impingement point 236 may be small enough for a mechanic or other user to discern the alignment of the steerable portions of the steerable nose landing gear 100 to 1° or less.

In various aspects, the fixture 200 is made of a plastic material such as nylon, polyoxymethylene (e.g., Delrin® by DuPont), amorphous thermoplastic polyetherimide (PEI)

resin (e.g., ULTEM™ by Sabic), acrylonitrile butadiene styrene (ABS), or the like. In various circumstances, using such plastic materials may be preferable to avoid causing scratches, tool marks, or the like to the landing gear surfaces.

Figure 4:
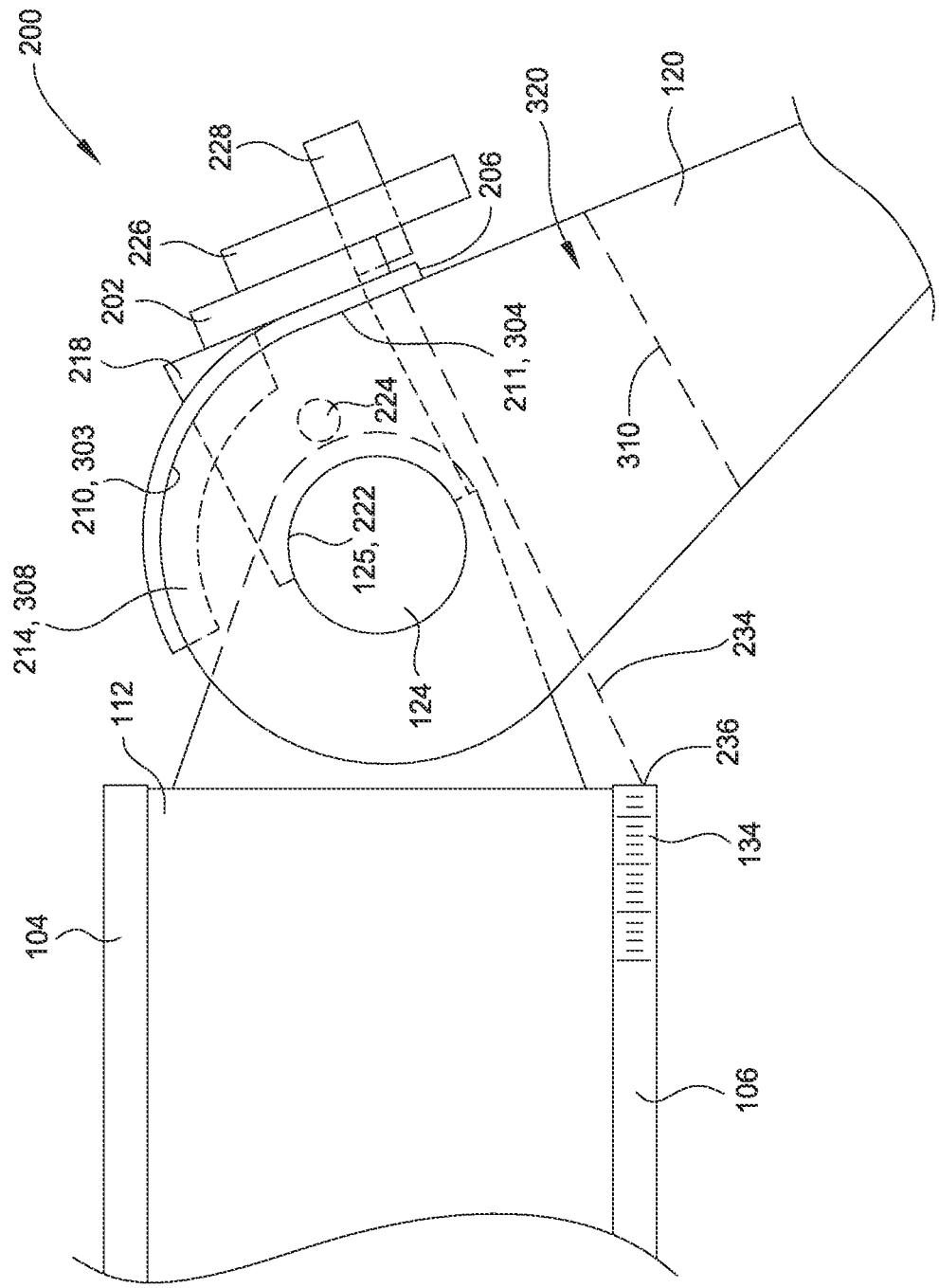
FIG. 4 is a side view of the nose landing gear of FIGS. 1A and 1B with the alignment fixture of FIGS. 2A and 2B positioned on the torsion link of the nose landing gear, and wherein a coherent light beam admitted by a coherent light source of the alignment fixture impinges on alignment scale of the nose landing gear.

In various aspects, the fixture 200 could include one or more adjustments that enable a mechanic or other user to adjust the fixture to compensate for changes in the geometry of the aircraft. Referring to FIG. 4, it should be apparent that the beam of emitted coherent light 234 could impinge above or below the alignment scale 134 depending on the angle of the first torsion link 120 relative to the steering bracket 106 (e.g., due to differences in the amount of weight supported by the steerable nose landing gear 100 when the alignment procedure is performed). The fixture 200 could include one or more adjustments that enable a mechanic or other user to adjust the impingement point 236 of the beam of emitted coherent light 234 up or down so that it falls on the alignment scale 134. For example, the bracket 226 that holds the coherent light source 228 could be attached to the body 202 of the fixture 200 by bolts. Turning the bolts could change an angle of the bracket 226 relative to the body 202, thereby changing the orientation of the beam of coherent light 234 relative to the fixture 200.

Figure 5:
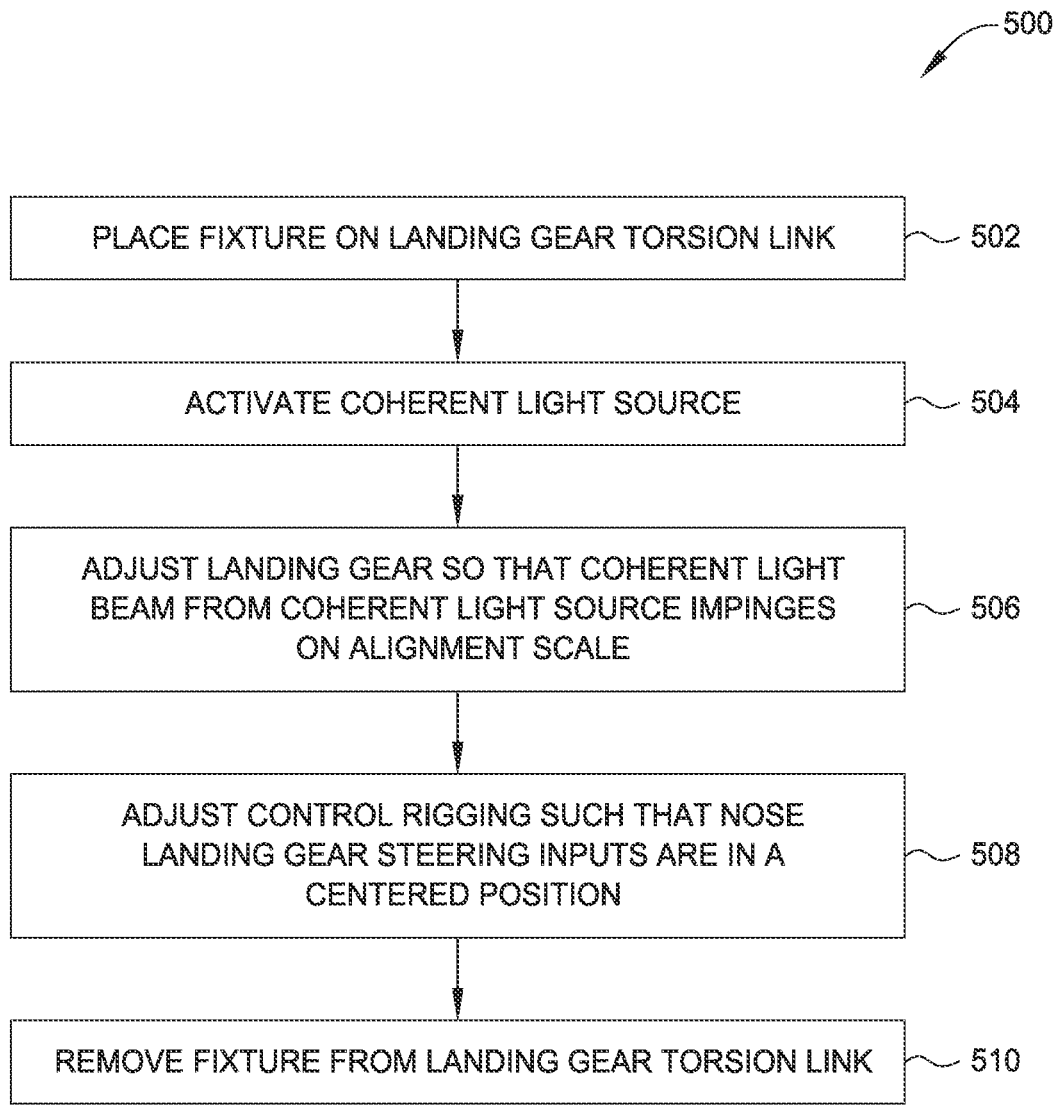
FIG. 5 is a block diagram for a method for aligning a steerable nose landing gear of an aircraft.

FIG. 5 is a flow chart that illustrates a method 500 for aligning a steerable nose landing gear using the fixture 200, discussed above. In block 502, the fixture is placed on a torsion link of a steerable nose landing gear. As discussed above, the fixture includes various surfaces that meet with and abut corresponding surfaces of the torsion link of the steerable nose landing gear. When the fixture is properly seated on the torsion link of the landing gear, the fixture is accurately positioned to emit a beam of coherent light that accurately impinges on an alignment scale. In block 504, the coherent light source, such as a laser, is activated. Thereafter, in block 506, the landing gear is moved so that the coherent light beam from the coherent light source impinges on a center indication of the alignment scale. As discussed above, the coherent light beam can produce a small spot of light on the alignment scale, which may enable the mechanic or other user to align the steerable portions of the steerable nose landing gear to within a degree of actual center. In block 508, after the steerable portions of the steerable nose landing gear have been centered, the mechanic or other user can adjust the control rigging such that the steering inputs used by the pilots to control the steerable nose landing gear are also centered. In block 510, after the rigging has been adjusted, the fixture can be removed from the torsion link of the landing gear (and the coherent light source can be turned off).

In various aspects, the use of the fixture 200 for alignment could allow for the alignment scale 134 to be omitted from the steerable nose landing gear 100. Rather, a center indication, such as an etched line, could be included on the non-rotating structure (e.g., on the steering bracket 106). After the fixture 200 is placed on the nose landing gear 100, the beam of coherent light 234 (shown in FIGS. 2B and 4) from the coherent light source 228 impinges on the non-rotating structure and the rotating portions of the steerable nose landing gear 100 is turned until the beam of coherent light 234 impinges on the center indication.

By using an alignment fixture, such as the alignment fixture 200 described above, a mechanic or other user can more accurately center a steerable nose landing gear than is possible using the alignment scale and indicator that are built into the nose landing gear. As discussed above, the built-in indicator may not provide a sufficient accurate indication of center to adjust the nose landing gear to an acceptable alignment (e.g., within 3° of center). Thus, the mechanic or other user may have to taxi the aircraft after adjusting the rigging to see if the changes made bring the aircraft into an acceptable degree of alignment. The mechanic may have to adjust the rigging several times through trial and error to bring the aircraft into an acceptable degree of alignment. By providing a more accurate indication of center for the steerable nose landing gear before adjusting rigging between the steering inputs and hydraulic actuators that steer the nose landing gear, the mechanic or other user may be able to reliably adjust the nose landing gear to an acceptable alignment with one adjustment.

Figure 6A:
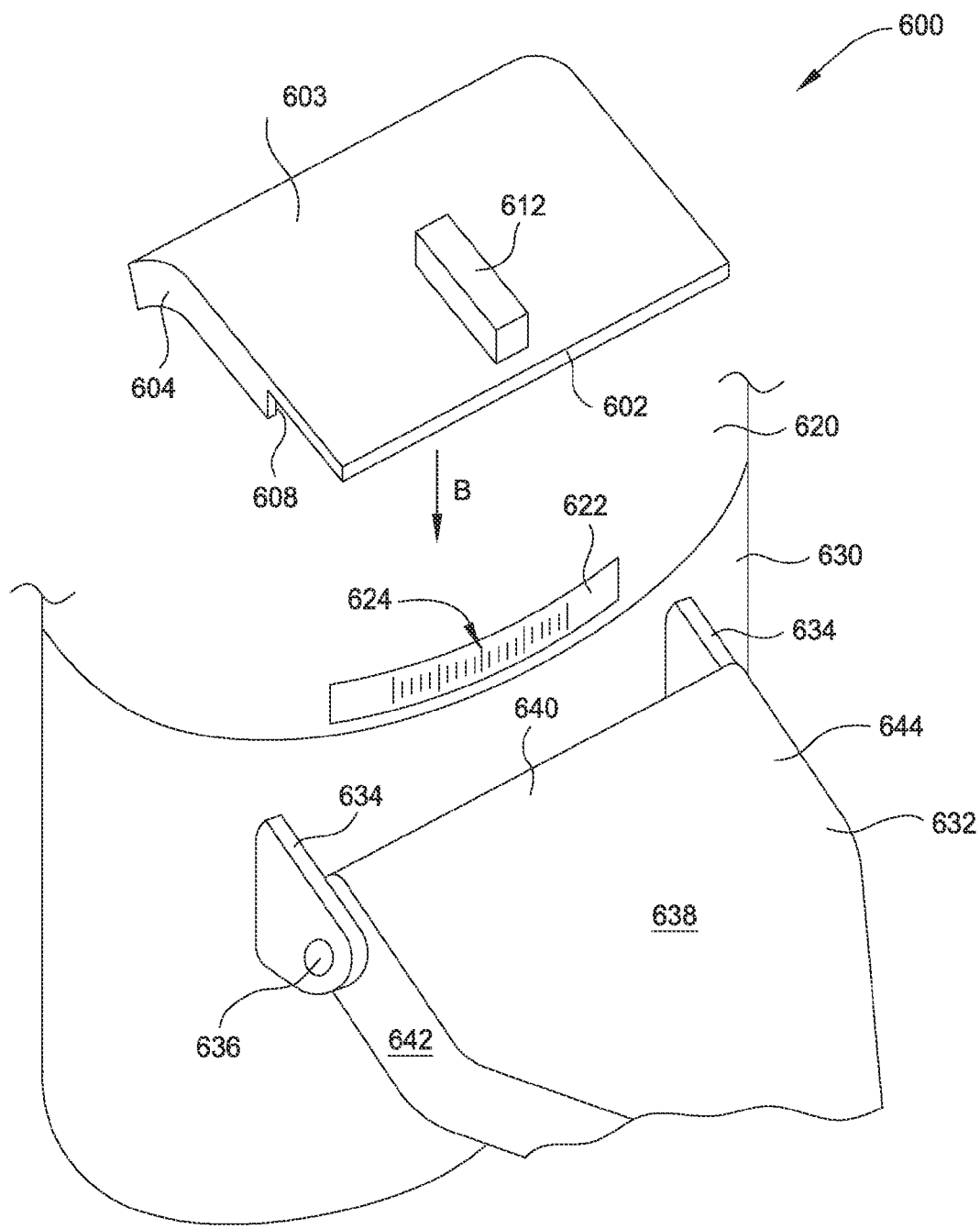
FIG. 6A is a partial perspective of two components that move relative to one another, wherein an alignment fixture according to at least one aspect is being moved into position on a portion of one of the components.
Figure 6B:
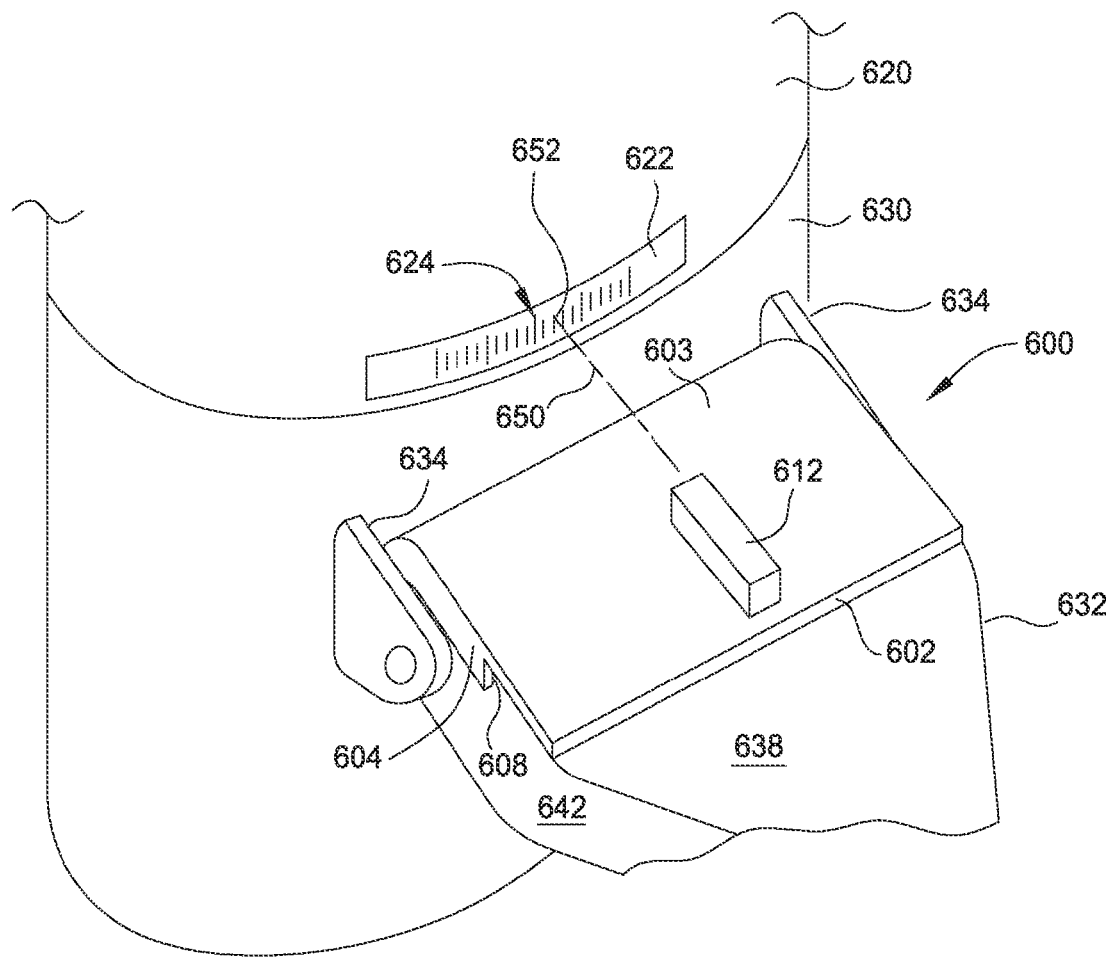
FIG. 6B is a partial perspective view of the two components of FIG. 6A, wherein the alignment fixture is positioned on the portion of the component.
Figure 6C:
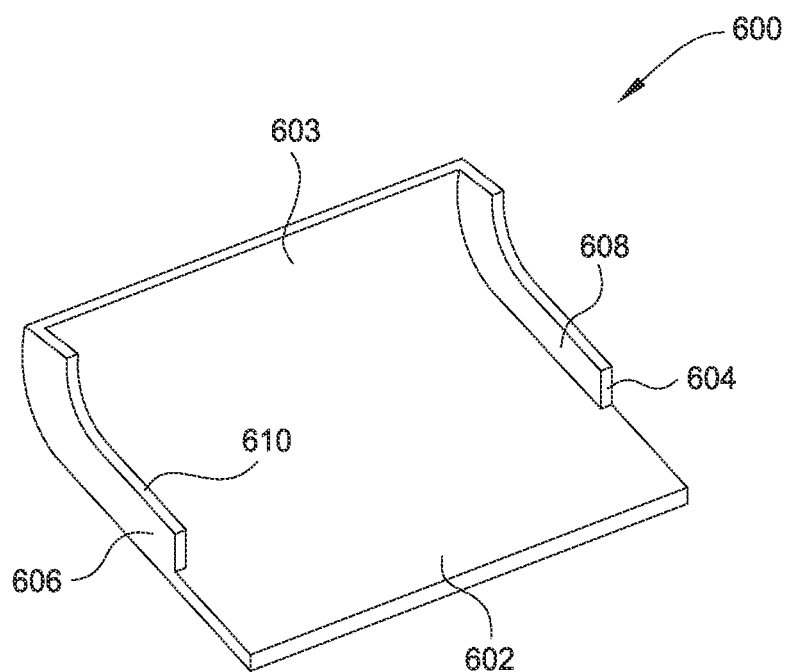
FIG. 6C is a perspective bottom view of the alignment fixture shown in FIGS. 6A and 6B.

FIGS. 6A-6c illustrate another aspect of an alignment fixture 600 for providing an alignment indication between two components that are operable to move (e.g., rotate) relative to each other. In FIGS. 6A-6C, a first component 620 is stationary and a second component 630 rotates relative to the first component 620. The second component 630 includes a torsion link 632 attached via brackets 634 and pin 636. In various circumstances, the torsion link 632 could be a different component. The torsion link 632 includes a flat surface 638 and a curved surface 640 (i.e., curved feature). The torsion link 632 also includes a first outward-facing surface 642 and a second outward-facing surface 644, which are arranged at angles relative to the flat surface 638 and the curved surface 640. In the illustrated example, the outward-facing surfaces 642 and 644 are each arranged at a 90° angle relative to the flat surface 638 and the curved surface 640. Referring primarily to FIG. 6C, the alignment fixture 600 includes a first flat surface 602 and a curved surface 603. The curved surface 603 is arranged with a curvature that substantially matches the curvature of the curved surface 640 of the torsion link 632. When the alignment fixture 600 is placed onto the torsion link in the direction of arrow B (shown in FIG. 6A), the first flat surface 602 of the alignment fixture 600 abuts the flat surface 638 of the torsion link 632 and the curved surface 603 of the alignment fixture 600 abuts the curved surface 640 of the torsion link 632. The alignment fixture 600 also includes a first side wall 604 that includes an inward-facing second flat surface 608 that is arranged at an angle relative to the first flat surface 602. For example, in the illustrated embodiment in FIGS. 6A-6C, the inward-facing second flat surface 608 is arranged at a 90° angle relative to the first flat surface 602. When the alignment fixture 600 is placed on the torsion link 632, the inward-facing second flat surface 608 abuts the first outward-facing surface 642 of the torsion link 632. When the first flat surface 602 of the alignment fixture 600 abuts the flat surface 638 of the torsion link, the curved surface 603 of the alignment fixture 600 abuts the curved surface 640 of the torsion link 632, and the inward-facing second flat surface 608 of the alignment fixture 600 abuts the first outward-facing surface 642 of the torsion link 632, the alignment fixture 600 is positioned and aligned in three dimensions relative to the torsion link 632.

Optionally, the alignment fixture 600 could include a second side wall 610 that includes an inward-facing third flat surface 610. The inward-facing third flat surface 610 can abut the second outward-facing surface 644 of the torsion link 632. In various circumstances, the inward-facing third flat surface 610 could secure the alignment fixture 600 on the torsion link 632. For example, a dimension between the inward-facing second flat surface 608 and the inward-facing third flat surface 610 could be slightly smaller than a dimension between the first outward-facing surface 642 and the second outward-facing surface 644 of the torsion link 632, resulting in an interference fit between alignment sidewalls 604 and 606 of the alignment fixture 600 and the torsion link 632. Friction between the inward-facing second flat surface 608 and the first outward-facing surface 642 and friction between the inward-facing third flat surface 610 and the second outward-facing surface 644 could hold the alignment fixture 600 in place relative to the torsion link 632.

Referring primarily to FIGS. 6A and 6B, the alignment fixture 600 includes a light source 612 that is operable to emit a coherent light beam. When the alignment fixture 600 is positioned and aligned on the torsion link 632, the coherent light beam 650 from the light source 612 can impinge on an alignment scale 622 on the first component 620. FIG. 6B illustrates the impingement point 652 of the coherent light beam 650 away from the center mark 624 of the alignment scale 622, indicating that the second component 630 is not aligned at center relative to the first component 620. The first component 620 and the first component 630 can be aligned in a manner similar to that described above with reference to FIG. 5.

In various aspects, the alignment fixture (e.g., the alignment fixture 200 shown in FIGS. 2A-2B, 3A-3B, and 4 or the alignment fixture 600 shown in FIGS. 6A-6C) could be made from a multiple pieces that are assembled together using fasteners (e.g., bolts or rivets) or adhesives. In various other aspects, the alignment fixture could be formed from a unitary piece, except for the light source. For example, the alignment fixture could be formed from a block of material, such as Delrin or another material, that is machined (e.g., using traditional mills and lathes or using a computer numerical control (CNC) machine). As another example, alignment fixture could also be formed by injection molding or the like. As another example, the alignment fixture could be formed using a three-dimensional printing process. After the alignment fixture is formed, the light source can be inserted.

Descriptions of the various aspects have been presented herein for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects of the present invention, other and further aspects of the invention may be devised without departing from the basic scope thereof, and the scope thereof is determined by the claims that follow.

What is claimed is:

1. An apparatus for providing an alignment indication between two components, wherein a first component is movable relative to a second component, the apparatus comprising:
   a first surface that includes a first curved surface that matches a first curved feature of the first component;
   a second surface that matches a second feature of the first component, wherein the first surface and the second surface are arranged at an angle to one another;
   a laser operable to emit a coherent laser light beam, wherein the laser is arranged relative to the first surface and the second surface such that the coherent laser light beam impinges on an alignment scale on the second component when the first surface is arranged on the first feature and the second surface is arranged on the second feature; and
   a polarizing filter disposed on the laser and in the path of the coherent laser light beam.

2. The apparatus of claim 1, further comprising a third surface that matches a third feature of the first component, wherein the third surface is movable between a first position and a second position, wherein the third surface can be moved to the second position to contact the third feature after the first surface is arranged on the first feature and the second surface is arranged on the second feature.

3. The apparatus of claim 1, further comprising a magnetic element that provides a magnetic field, wherein the first component includes a ferrous element such that a magnetic force between the magnetic element and the ferrous element holds the apparatus relative to the first component when the apparatus is operatively positioned with respect to the first component.

4. The apparatus of claim 1, wherein the first surface and the second surface are comprised of Delrin.

5. A steering alignment fixture for a steerable nose landing gear of an aircraft, wherein the steerable nose landing gear includes a non-steerable portion and a steerable portion operable to rotate about the non-steerable portion, wherein the steerable portion includes a torsion link configured to transmit steering torque from an actuator to a wheel, and wherein the non-steerable portion includes an alignment scale, the steering alignment fixture comprising:
   a body that includes a first surface and a second surface, wherein the first surface includes a first curved surface that matches a curved feature of a torsion member of the landing gear, wherein the first curved surface is configured to rest on the curved feature of the torsion link of the landing gear, and wherein the second surface is configured to abut a first side-facing feature of the torsion link;
   a laser operable to emit a coherent laser light beam, wherein the laser is arranged relative to the body such that the coherent laser light beam impinges on the alignment scale when the first surface of the body rests on the torsion link and the second surface abuts the first side-facing feature of the torsion link; and
   a polarizing filter disposed on the laser and in the path of the coherent laser light beam.

6. The steering alignment fixture of claim 5, wherein the body includes a third surface, wherein the third surface is configured to abut a second side-facing feature of the torsion link, and wherein the third surface opposes the second surface.

7. The steering alignment fixture of claim 6, wherein the second surface is an outward-facing surface configured to abut a first inward-facing side-facing feature of the torsion link, and wherein the third surface is an outward-facing surface configured to abut a second inward-facing side-facing feature of the torsion link.

8. The steering alignment fixture of claim 5, further comprising a magnetic element arranged in the body, wherein the torsion link includes a ferrous pin such that a magnetic force between the magnetic element and the ferrous pin holds the body relative to the torsion link when the body is operatively positioned relative to the torsion link.

9. The steering alignment fixture of claim 5, wherein the body is comprised of Delrin.

10. A method for aligning a nose landing gear of an aircraft, comprising:
    arranging an alignment fixture tool on a torsion link of the nose landing gear such that a first surface of the alignment fixture rests on a first feature of the torsion link and a second surface of the alignment fixture abuts a first side-facing feature of the torsion link;

activating a coherent light source arranged relative to the alignment fixture such that a coherent light laser beam emitted by the coherent light source passes through a polarizing filter and impinges on an alignment scale on the nose landing gear;

adjusting the nose landing gear such that the coherent light laser beam impinges on a center indication on the alignment scale; and upon the coherent light laser beam impinging on the center indication, adjusting rigging between hydraulic actuators controlling rotation of the nose landing gear and at least one nose wheel steering input such that the at least one nose wheel steering input is substantially centered.

11. The method of claim 10, further comprising removing the alignment fixture tool after the at least one nose wheel steering input is substantially centered.

12. The method of claim 10, further comprising polarizing the coherent light beam before the coherent light beam impinges on the alignment scale.

13. The method of claim 10, further comprising securing the alignment fixture tool to the torsion link.

14. The method of claim 13, wherein securing the alignment fixture tool to the torsion link comprises moving a magnet in the alignment fixture tool into proximity with a ferrous pin associated with the torsion link.

15. The method of claim 10, wherein arranging the alignment fixture tool on the torsion link further includes arranging a third surface of the alignment fixture such that it abuts a second side-facing feature of the torsion link, wherein the third surface opposes the second surface.

* * * * *